Patented Mar. 22, 1927.

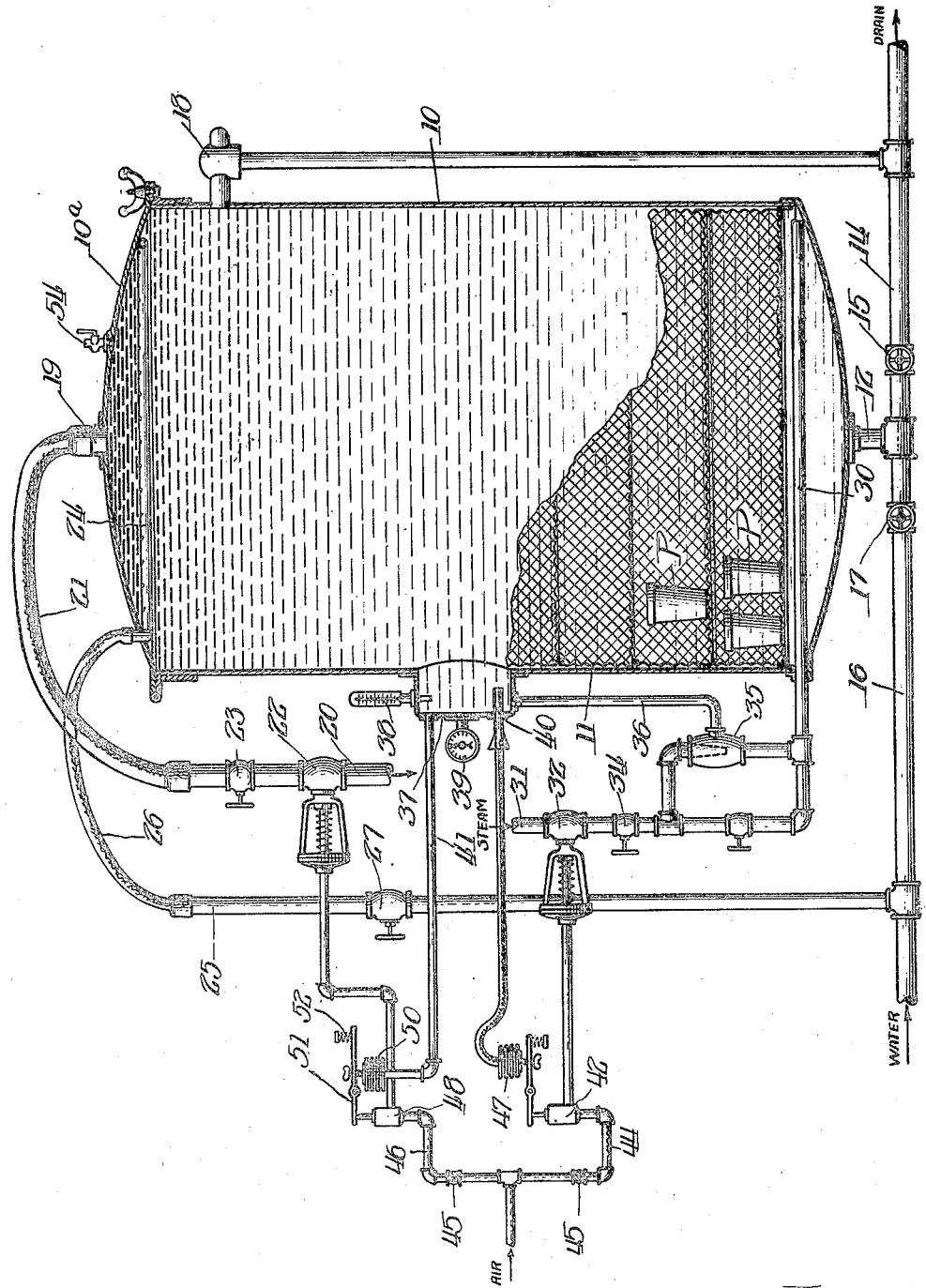

1,621,698

UNITED STATES PATENT OFFICE.

GEORGE P. WHITE, OF CHICAGO, ILLINOIS, ASSIGNOR TO WHITE CAP COMPANY, OF CHICAGO, ILLINOIS, A CORPORATION OF DELAWARE.

PRESSURE PROCESSING.

Application filed August 27, 1925. Serial No. 52,950.

This invention relates generally to preserving, and specifically to improvements in method for the cooking or preservation of perishable products in marketable packages.

The art is familiar with various practices and kinds of apparatus for the pressure processing of canned goods in which the pressure of steam and of air, sometimes intermingled and sometimes employed separately, is used for applying external pressure to packages which are to be subjected to a cooking or sterilizing heat, to prevent the distortion or opening of the packages by the pressures which are developed within them during the treatment. Sometimes these pressures are transmitted to the packages through the medium of a body of liquid in which the packages are submerged during the cooking operation. The present invention bears a superficial similarity to these prior practices in the fact that it accomplishes the application of external pressure to the packages. Through its distinctive features, however, it is designed to eliminate various uncertainties, disadvantages and complications which are inherent in the procedures heretofore employed.

The general purpose of the invention is the provision of an improved apparatus and process which will be productive of high efficiency, resulting not only from simplicity and economy in operation, but also from elimination of loss in the goods treated and from the high quality obtainable in the product by its employment.

More particularly stated, the various objects of the invention include:

The provision of a process which may be regulated or controlled either by direct intelligent supervision or automatically;

A process and apparatus which will accomplish thorough and uniform treatment of all the packages submitted to treatment in a batch;

A process and apparatus which greatly simplifies the maintenance of the desired external pressure on the packages during both the heating and cooling treatments and eliminates the possibility of sudden pressure fluctuations resulting from changes in temperature.

The provision of a process which practically eliminates the possibility of the breaking of glass containers by sudden or extreme changes in temperature during either the heating or the cooling procedures;

The provision of a process in which the pressure and heating factors are susceptible of separate and independent control;

The provision of a process which makes for expedition in the treatment of a batch of packages; and The provision of a process which is practically free from hazard to individuals occupied with it or to the installations themselves.

Other and further objects of the invention will be pointed out hereinafter, indicated in the appended claims, or obvious to one skilled in the art upon an understanding of the present disclosure. For the purpose of this application I have elected to illustrate diagrammatically and to describe one fashion in which the invention may be practiced, it being understood that the same is presented here for purpose of illustration only, to teach those skilled in the art how the invention may be practiced, and without the purpose of imposing any unnecessary or undue limitation upon the invention defined in the appended claims.

In the drawing forming a part of the specification, the figure is a diagrammatic drawing in the nature of a sectional elevation of apparatus in which the invention may be practiced.

A characteristic feature of the invention is the employment of water, or other suitable liquid, as the medium for the application of heat to the packages and also as the medium for the generation and application of the external pressures thereto. This is accomplished by confining the packages within a body of liquid and then heating the liquid while it is under mechanical constraint effective to oppose its expansion in volume attendant upon its increase in temperature. In this fashion pressures generated within the liquid itself are caused to react upon the packages as external pressure effective to counteract the pressures generated within them by the heat. This and other features will be described more in detail hereinafter.

For a more specific understanding of the invention, let reference be made to the illustration, which, it will be observed, shows in sectional elevation a retort or autoclave 10 having the removable cover 10ª and adapted to accommodate the introduction and removal of crates or trays 11 which form supports and convenient handling containers for the packages P which are to be treated. The cover is adapted to make a substantial water tight closure for the retort and to be secured in closed position. The retort is to be made of any suitable material of the strength necessary to sustain the operating pressures, and preferably having a substantial degree of elasticity, comparable to boiler plate. At the bottom of the retort is a connection 12 having communication with the drain 14, under control of valve 15, and having communication with the water line 16 under control of the valve 17. Water is supplied to line 16 under a pressure superior to the pressure contemplated in the carrying on of the process. A safety valve 18 is provided for relieving the retort of pressure in excess of some established maximum. At the top of the retort is the relief connection 19, communicating with the relief pipe 20 by a flexible connection 21 arranged to permit the swinging of the cover 10ª. These provide a path of communication with the retort which is controlled by the automatic relief valve 22 and hand valve 23. On the cover is carried the distributing spray or coil 24 having distributed outlets preferably directed upwardly, which spray is supplied from the water line 16 through the water admission pipe 25 and flexible connection 26. Water admission pipe 25 is controlled by admission valve 27. In the bottom of the retort is a steam inlet pipe 30, preferably provided with distributing orifices directed downwardly. This is supplied with steam from the steam supply pipe 31 at a pressure in excess of that contemplated for employment within the retort. Admission of steam to the steam inlet pipe 30 is controlled by steam admission valves 32 and 34. In a by-pass from the steam supply pipe is the injector 35 arranged to induce movement of liquid through a circulation pipe 36 leading from the instrument pocket 37 which is attached to and has open communication with the retort. Communicating with the interior of this pocket are the various detecting devices, including the thermometer 38, the pressure indicator 39, the thermostat device 40 and the pressure tube 41. The expansive element 47 of the thermostat device is rendered effective upon a pilot valve 42 which controls the compressed air line 44 in which a constant air pressure is maintained from a suitable compressor. When this pressure is impressed on the diaphragm of valve 32, it will be effective to close the valve against the influence of its spring, all in the well known fashion in which such valves operate. When the heat to which the thermostat device 40 is subjected within the retort reaches a predetermined degree, the thermostat device will open the valve 42 and permit valve 32 to be closed by the air pressure admitted from line 44, thus cutting off the supply of steam to the retort. Relief valve 22 is likewise arranged to be closed by pressure from air line 46, said air line being controlled by pilot valve 48. The pressure within the retort is transmitted through the pressure line 41 to a motive device 50 which is effective, on expansion, to swing the lever 51 against the influence of its spring 52. When the pressure within the retort reaches a predetermined maximum, lever 51 will be moved by the motive device 50 to close pilot valve 48 and vent the diaphragm chamber of relief valve 22, which will permit said valve to be opened by its spring, and relieve pressure from the retort through lines 21 and 20. Valves 22 and 32 may be cut out by closing air line valves 45, which leaves valves 22 and 23 held open by their springs. A vent cock 54 may be provided at the top of the retort to be operated by hand.

In the practice of the process by use of the apparatus described, the crates, filled with the hermetically closed packages, are charged into the retort, steam valve 34 and water valve 17 being closed. Water is then admitted from line 16 by opening valve 17, and steam is admitted from line 31 by opening valve 34, until the retort is practically filled, the water thus being heated to a certain extent by the steam incident to the filling of the chamber. The cover is then closed down and secured in closed position, valves 22 and 23 being opened when desired to permit the venting of the remaining air from the retort. The admission of steam is continued, with the effect of gradually but rapidly raising the temperature of the water. The automatic control now may be cut in by opening valves 45, which has the effect of closing automatic valve 22. As the temperature of the water, now confined within the retort, continues to rise incident to the continued admission of steam, it tends to expand against the constraint of the retort, thus generating a pressure which is effective upon the contained packages to prevent their becoming distorted or uncapped by the pressures developed within them by the heat to which they are subjected. This heat, of course, is imparted to them from the water in which they are immersed, and is of the degree desirable or requisite for the cooking or sterilizing of the packaged material. Practice has demonstrated that in order to prevent distortion or uncapping of the packages by internal pressure it is necessary to apply to them an external pressure which is in excess of the pressure of saturated steam at the temperature employed for the sterilizing or cooking. Such pressure is obtained in the practice of my invention by constraining the expansion tendency of the water as it is heated, whereby I am able to generate pressures amply in excess of the pressure of saturated steam at the same temperature. In the automatic operation of the apparatus the operating temperature is predetermined by the setting of the thermostat device which, so long as the temperature remains at the desired point, will hold the valve 32 closed, but permit the same to open when the temperature of the water in the retort falls below that desired. In the same fashion the operating pressure in the retort is held at the desired degree by the automatic operation of valve 22, which remains closed so long as the pressure does not exceed the desired maximum, and opens automatically to relieve excess pressure as it is developed. Valve 23 may be adjusted to throttle down the flow capacity of line 20, so that automatic valve 22 may exercise a very close control and avoid over-correction. In this fashion both temperature and pressure are maintained practically constant throughout the processing period. Once the desired pressure is obtained, there is but little possibility of its falling below the requisite minimum, as it is impossible for a sudden and extreme drop in the temperature of the confined water to occur. At the end of the cooking or sterilizing period the steam supply is completely cut off by the closing of valve 34, and cold water is admitted to the distributor 24 by the opening of valve 27. This water, which is supplied at a pressure in excess of that maintained in the retort, is distributed through the volume of the hot water in the upper part of the retort, and tends to settle until its temperature is equalized with the water about it. In this fashion the temperature of the entire body of water within the retort is gradually reduced, to cool the packages to a point where it is safe to relieve them of the external pressure. Incident to this cooling operation the external pressure is maintained on the packages as before, by the automatic regulating effect of valve 22, which permits the water displaced by the entering cooling water to find exit through the outlet 19 and relief pipe 20. When the packages have been cooled to the requisite degree, enough water is drawn off by the opening of drain valve 15 to permit the opening of the retort without its overflowing. The retort being then opened, the crates are withdrawn and replaced by others containing a batch of unprocessed packages. These are lowered into the water remaining in the retort, and the process repeated in the manner described above.

The practice of the process is not dependent on automatic regulation or on the particular apparatus here illustrated. By observation of the temperature indicator 38 and the pressure indicator 39, temperature of the water in the retort may be regulated and maintained at the desired degree by hand operation of valve 34 as the occasion demands, and the retort pressure likewise may be controlled by hand operation of the valve 23.

A highly advantageous feature of the present invention resides in its freedom from the possibility of sudden and radical drop in pressure due to a drop in temperature. In this respect it possesses a very marked distinction from methods wherein steam or heated air or mixtures of the two are depended on to maintain the pressure. In such practice an inadvertent admission of cooling water, or other causes, may result in a very sudden cooling of the steam and air in the retort, causing a sudden and radical drop in pressure which is likely to result in the uncapping of some or all of the packages. This is impossible in the use of my invention as the hot water is not susceptible to the sudden cooling or the contraction in volume such as steam or heated air. A further great advantage resides in the elimination of possible injury to glass vessels and the like at the start of the cooling operation, as in practice of my invention the heated packages are not exposed to the danger of breakage by being subjected suddenly to contact with cold water. Nevertheless, the cooling operation is accomplished quickly, because the reduction in temperature is continuous, without requiring any time for preliminary cooling of the retort, or any preliminary tempering of the cooling water. Advantages are gained similarly in the cooking or sterilizing. Upon the application of heat, the temperature is raised rapidly but gradually, so that the packages are not subjected to a sudden scalding. This is of advantage not only as a safeguard against fracturing glass containers, but also tends to improve the quality and appearance of the product, as it gives an opportunity for the heat to be transmitted and distributed to the material in the package, thus preventing the portion in direct contact with the vessel being subjected to excessive heating. A particular advantage resides in the assured uniformity of cooking of the entire charge. This may be understood particularly in comparison with practices in which mixtures of heated air and steam are used. Not only is advantage gained because of the much better heat conductivity of the water, but the convection is much better, and such incidents as cool areas and air pockets, which are more or less prevalent where compressed air is used, are avoided. A very substantial conservation of heat is possible, due to the retention in the retort of the partially heated water after the processing of a batch.

All of these various features contribute not only to certainty in the carrying out of the process, and the elimination of loss from injury to packages, but also greatly expedite the proceeding, and thereby increase the efficiency of operation. Further advantages reside in the simplicity of the requisite apparatus and the procedure, as it is not necessary to provide for equalization of water pressure with the steam pressure or to maintain uniformity of either. The only prerequisites as to the service line conditions are that the steam pressure and the water pressure be suitably in excess of the maximum pressure which it is desired to maintain in the retort, so that either steam or water may be introduced into the retort against the retort pressure whenever occasion demands.

The apparatus herein described is claimed in my co-pending application, Ser. No. 130,939, filed August 23, 1926.

What I claim is:

1. A method of pressure processing which comprises submerging packages in a body of liquid, heating the liquid to induce its expansion and to transmit heat to the packages, and meanwhile constraining the body of liquid against expansion, whereby to apply to the packages the pressure generated by the expansive tendency of the liquid incident to its heating.

2. A method of operating an autoclave for pressure processing, which comprises submerging sealed packages in a body of water, confining the body of water and sealed packages within the autoclave, heating the water in the autoclave, constraining the expansive tendency of the water by the autoclave, and regulating the resulting pressure of the heated water by venting a portion thereof.

3. A method of operating an autoclave for pressure processing, which comprises submerging sealed packages in a body of water within the autoclave, heating the water in the autoclave, constraining the expansive tendency of the water by the autoclave, and cooling the packages by introduction of cold water into the upper portion of the body of water in the autoclave.

4. A method of pressure processing which comprises submerging packages in a body of liquid, subjecting the liquid to mechanical constraint against expansion, heating the confined liquid to induce its expansion, and limiting the pressure resulting from the expansive tendency of the liquid by removal of portions of the expanding liquid.

5. A method of pressure processing which comprises submerging packages in a body of liquid, confining the liquid and packages in an elastic container, and heating the liquid to expand it against constraint of the container.

6. A method of pressure processing packages which comprises submerging packages in a volume of liquid, heating the liquid with the packages therein, constraining the liquid against expansion incident to its heating, and regulating the resulting pressure on the packages by varying the quantity of liquid.

7. A method of pressure processing which comprises submerging sealed packages in a body of liquid, heating the liquid, constraining expansion of the liquid incident to its heating to apply a pressure to the packages, and adding cooling liquid to the heated body of liquid to cool it and the packages while it is under constraint, said cooling liquid being added at a rate to maintain pressure on the packages incident to the contraction of the body of liquid in cooling.

8. A method of pressure processing which comprises submerging packages in a body of liquid, constraining the liquid against expansion, applying heat to the bottom of the body of liquid while it is constrained against expansion, then adding a cooling liquid at the top of the body while it is under constraint.

9. A method of pressure processing which comprises submerging packages in a body of liquid, constraining the body of liquid against expansion, applying heat to the liquid while it is constrained against expansion, then adding a cooling liquid at the top of the body and permitting the escape of portions of the constrained body from the top thereof.

10. A method of pressure processing which comprises submerging packages in a body of liquid, constraining the body of liquid against expansion, and injecting steam into the liquid to heat it while it is constrained, to heat the packages and to apply to them the pressure generated by the expansive tendency of the liquid resulting from its heating.

11. A method of pressure processing comprising immersing sealed packages in a body of liquid, confining the liquid to constrain it against expansion, heating the liquid while it is constrained against expansion, and then cooling the packages by introduction of cold liquid at a rate exceeding the contraction of the confined liquid incident to its cooling.

In testimony whereof I have hereunto subscribed my name.

GEORGE P. WHITE.